United States Patent
Hwang et al.

(10) Patent No.: US 8,687,900 B2
(45) Date of Patent: Apr. 1, 2014

(54) IMAGE PROCESSING APPARATUS OF ROBOT SYSTEM AND METHOD AND COMPUTER-READABLE MEDIUM THEREOF

(75) Inventors: Won Jun Hwang, Suwon-si (KR); Woo Sup Han, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 320 days.

(21) Appl. No.: 12/876,465

(22) Filed: Sep. 7, 2010

(65) Prior Publication Data

US 2011/0075915 A1  Mar. 31, 2011

(30) Foreign Application Priority Data

Sep. 25, 2009  (KR) .......................... 10-2009-0091262

(51) Int. Cl.
*G06K 9/62* (2006.01)

(52) U.S. Cl.
USPC ............................ 382/225; 382/103; 382/153

(58) Field of Classification Search
USPC .................... 382/103, 153, 225, 263
See application file for complete search history.

(56) References Cited

U.S. PATENT DOCUMENTS

| | | | |
|---|---|---|---|
| 6,895,305 B2* | 5/2005 | Lathan et al. ................ | 700/245 |
| 7,957,837 B2* | 6/2011 | Ziegler et al. ................ | 700/258 |
| 8,090,193 B2* | 1/2012 | Higaki et al. ................ | 382/153 |
| 2005/0213818 A1* | 9/2005 | Suzuki et al. ................ | 382/190 |
| 2007/0188883 A1* | 8/2007 | Seo et al. ...................... | 359/676 |
| 2007/0203685 A1* | 8/2007 | Takano ........................ | 703/23 |
| 2008/0152191 A1* | 6/2008 | Fujimura et al. ............ | 382/103 |
| 2008/0184375 A1* | 7/2008 | Nonaka et al. ................ | 726/27 |
| 2011/0001813 A1* | 1/2011 | Kim et al. ..................... | 348/77 |
| 2011/0075915 A1* | 3/2011 | Hwang et al. ................ | 382/153 |

OTHER PUBLICATIONS

Rasmus Elsborg Madsen et al, Singular Value Decomposition and Principal Component Analysis, Feb. 2004, pp. 1-5.*

* cited by examiner

*Primary Examiner* — Gregory M Desire
(74) *Attorney, Agent, or Firm* — Staas & Halsey LLP

(57) ABSTRACT

Disclosed is an image processing apparatus, method and computer-readable medium of a robot which efficiently manage a moving image acquired by the robot and reinforce security to prevent image leakage. In order to restore an object region within an original image photographed by the robot, a low-resolution image is generated using object password information and the original image to generate image information, and the image information is transmitted to a server over a network. The server detects the object password information and the low-resolution information from the image information and restores a high-resolution object image using the object password information and the low-resolution image.

21 Claims, 8 Drawing Sheets

IMAGE PROCESSING APPARATUS OF ROBOT SYSTEM AND METHOD AND COMPUTER-READABLE MEDIUM THEREOF

CROSS-REFERENCE TO RELATED APPLICATIONS

This application claims the benefit of Korean Patent Application No. 2009-0091262, filed on Sep. 25, 2009 in the Korean Intellectual Property Office, the disclosure of which is incorporated herein by reference.

BACKGROUND

1. Field

Example embodiments relate to an image processing apparatus of a robot system, which efficiently manages a moving image acquired by a robot and reinforces security to prevent an image from being leaked, and a method and computer-readable medium thereof.

2. Description of the Related Art

With remarkable development of robot technology, an intelligent robot is expected to come into wide use in homes and offices in the near future.

Service provided by such an intelligent robot which is attracting much attention includes a security function for monitoring incidents which takes place in and around a house and preventing external invasion. For example, when a user goes out or sleeps, a robot photographs and records an image while patrolling to adequately cope with an external invader or an incident which takes place in a house.

A recorded image is acquired by storing an image photographed by a camera of a robot in a recording medium, and a moving image photographed by the camera needs to be stored for a long period of time.

If a moving image photographed by a robot is stored, a high-performance computer to process large volumes of images is necessary. Accordingly, the size of the robot is increased and a battery to supply sufficient power is secured. In addition, when high-resolution images obtained by a high-performance digital camera which has been rapidly developed are recorded over a long period of time, large volumes of images are stored in correspondence with a photographing time.

As another example, there is a method of connecting a robot to a server over a network, transmitting a photographed image to the server, and storing and managing image information at the server. This method reduces a image processing burden on the robot, but a transmission time is increased due to a network burden because large volumes of moving images are compressed and are transmitted to the server. At the time of image transmission, privacy may be undesirably violated due to image interception or leakage and thus security is weak. In addition, since a plurality of intelligent robots is connected to one server, network load needs to be decreased by decreasing the capacity of information transmitted from a system managed by the server to the server.

SUMMARY

Therefore, it is an aspect of the example embodiments to efficiently process a moving image acquired by a robot having a monitoring function.

It is another aspect of the example embodiments to encrypt an object region, which needs to be carefully processed, in an original image photographed by a robot to reinforce security and prevent privacy from being violated due to image leakage.

The foregoing and/or other aspects are achieved by providing an image processing method of a robot system, the method including: acquiring an original image by a robot, generating, by a processor, object password information used for restoring an object image within the original image, and converting, by the processor, resolution of the original image and generating a low-resolution image.

The method may further include compressing image information including the object password information and the low-resolution image and transmitting the compressed information from the robot to a server over a network.

The generating of the object password information may include detecting an object region within the original image, clustering the detected object region based on a similar feature, generating cluster information indicating which cluster the object region belongs to, and generating a high-resolution basis vector to restore the image according to the detected object.

The detecting of the object region may be performed using Scale Invariant Feature Transform (SIFT).

The clustering of the object region may be performed using a K-means clustering algorithm.

The generating of the basis vector may include extracting a high-resolution Principal Component Analysis (PCA) basis vector using Singular Value Decomposition (SVD).

The converting of the resolution of the original image may include down-converting the resolution using an average of peripheral pixels.

The original image may include a moving image continuously photographed by a camera of the robot.

The foregoing and/or other aspects are achieved by providing an image processing method of a robot system, the method including: detecting, by a processor, image object password information used for restoring an object image within an original image and a low-resolution image obtained by converting resolution of the original image into a low resolution, from image information received from a server, and restoring, by the processor, a high-resolution object image using the object password information and the low-resolution information.

The detected object password information may include an object region within the original image, cluster information indicating which cluster the detected object region belongs to, and a high-resolution Principal Component Analysis (PCA) basis vector used for restoring an image according to the detected object.

The restoring of the object image may be performed using a Bayesian-based high-resolution restoration method.

The restoring of the object image may include estimating a high-resolution feature vector from the object password information and restoring the object image using the estimated high-resolution feature vector.

The foregoing and/or other aspects are achieved by providing an image processing apparatus of a robot system, the image processing apparatus including: an object region detection unit to detect an object region within an original image photographed by a robot, a clustering unit to cluster the object region according to a similar feature and assign the object region to a cluster, a basis vector generation unit to generate a high-resolution basis vector used for restoring an image according to an object, an object password generation unit to generate object password information including the object region, cluster information indicating which cluster the object region belongs to, and the high-resolution basis vector, and a low-resolution generation unit to generate a low-resolution image from the original image.

The image processing apparatus may further include an image compression and transmission unit to compress image information including the object password information and the low-resolution image and to transmit the compressed information to a server over a network.

The object region detection unit may detect the object region using Scale Invariant Feature Transform (SIFT).

The clustering unit may cluster the object region using a K-means clustering algorithm.

The basis vector generating unit may extract a high-resolution Principal Component Analysis (PCA) basis vector using Singular Value Decomposition (SVD).

The foregoing and/or other aspects are achieved by providing an image processing apparatus of a robot system, the image processing apparatus including: an object password information detection unit to detect object password information used for restoring an object image within an original image from image information received from a server, a low-resolution detection unit to detect a low-resolution image corresponding to the original image from the image information, and an object image restoration unit to restore a high-resolution object image using the object password information and the low-resolution image.

The object image restoration unit may restore the object image using a Bayesian-based high-resolution restoration method.

The object image restoration unit may estimate a high-resolution feature vector from the object password information and restore the object image using the estimated high-resolution feature vector.

As described above, according to the image processing apparatus, method and computer-readable medium of the robot system, since the original image is converted into the low-resolution image and the low-resolution image is transmitted to the server over the network, network load may be reduced. Thus, deterioration in transmission efficiency is prevented and storage and management of a recorded image at the server is facilitated.

In addition, according to the image processing apparatus, method and computer readable medium of the robot system, security is reinforced in a manner of transmitting image information in a state in which the object region carefully subjected to image processing is encrypted, to efficiently prevent privacy from being violated due to image leakage.

The foregoing and/or other aspects are achieved by providing at least one computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings.

Figure 1:
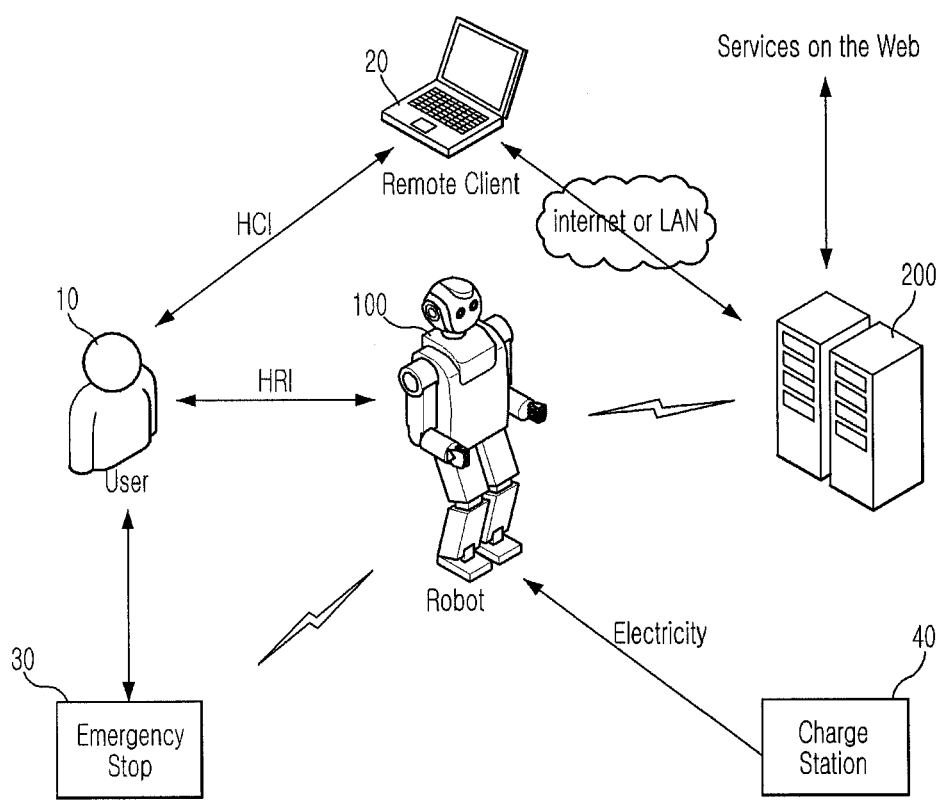
FIG. 1 is a schematic view explaining the concept of a robot system according to example embodiments.

As shown in FIG. 1, the operation of a robot may be controlled according to a user command through Human Robot Interaction (HRI) between an intelligent robot 100 and a user 10. In a robot system based on a network such as the Internet or a Local Area Network (LAN), information stored in and managed by a server 200 is available by Human Computer Interaction (HCI) between a remote client such as a notebook type computer and the user 10. The information is available by accessing the server 200 over the Web.

An emergency stop 30 enables the robot to take necessary action or inform the user 100 of the emergency, when the robot 100 malfunctions or an emergency occurs which may interrupt the operation of the robot.

The robot 100 has a charging battery. If power of the battery runs low, the robot moves to a charge station 40 to charge the battery while performing a service.

Figure 2:
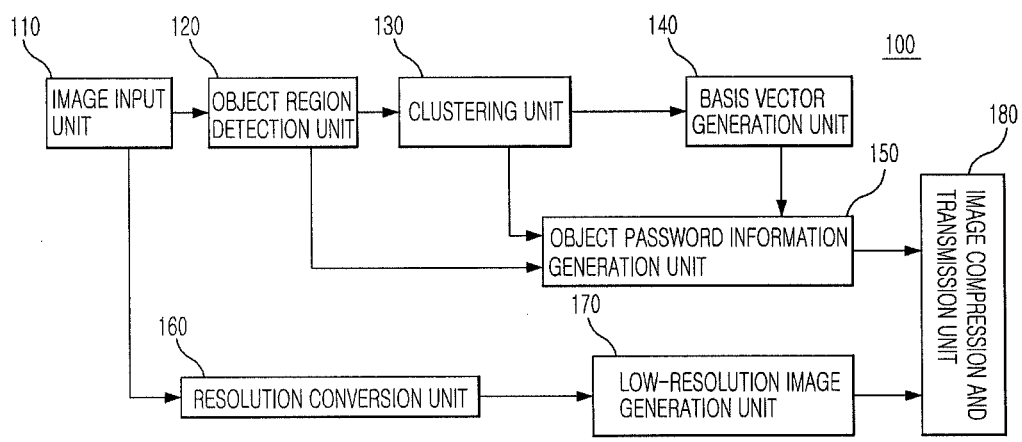
FIG. 2 is a block diagram showing a robot in an image processing apparatus of a robot system according to example embodiments.
Figure 3:
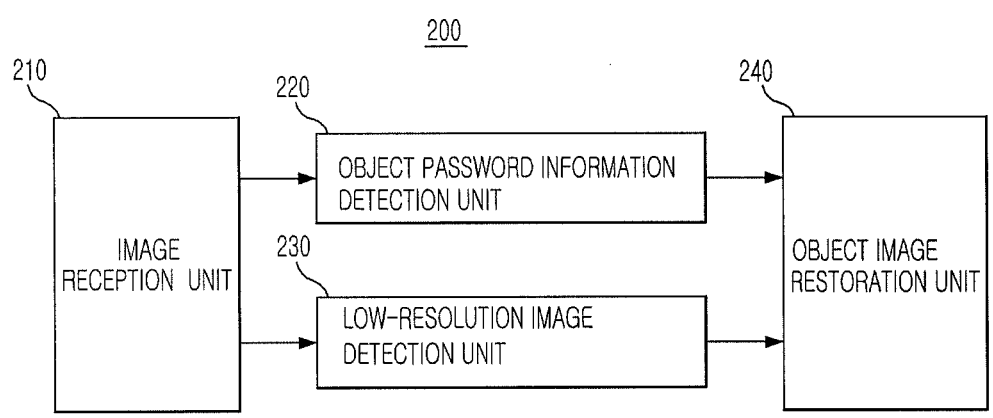
FIG. 3 is a block diagram showing a server in the image processing apparatus of the robot system according to the example embodiments.
Figure 4:
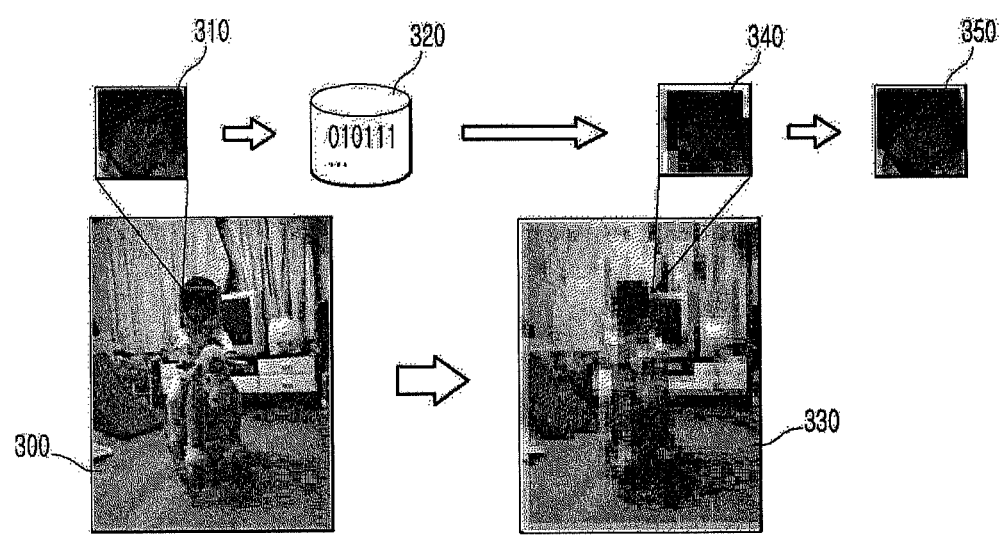
FIG. 4 is a view showing an image processing process according to the example embodiments.

FIG. 2 is a block diagram showing a robot in an image processing apparatus of a robot system according to example embodiments. FIG. 3 is a block diagram showing a server in the image processing apparatus of the robot system according to example embodiments. FIG. 4 is a view showing an image processing procedure according to example embodiments.

The robot 100 includes an image input unit 110 to provide a high-resolution moving image, a object region detection unit 120 to detect an object region 310 from the high-resolution image, a clustering unit 130 to cluster the detected object region and assign the object region to a cluster, a basis vector generation unit 140 to generate a basis vector according to objects, an object password generation unit to generate object password information 320 using the object region, cluster information indicating which cluster the object region belongs to, and the basis vector in association with the object, a resolution conversion unit 160 to convert the resolution of the high-resolution image into low resolution, a low-resolution image generation unit 170 to generate a low-resolution image, and an image compression and transmission unit 180 to compress the object password information and the low-resolution image and to transmit the compressed image information to the server 200 over a network.

The server 200 includes an image reception unit 210 to decompress the image information received from the robot 100, an object password information detection unit 220 to detect the object password information from the decompressed image information, a low-resolution image detection unit 230 to detect a low-resolution image 330 from the decompressed image information, and an object image restoration unit 240 to restore a high-resolution object image 350 using the detected object password information with respect to the low-resolution object image 340 corresponding to the object region in the detected low-resolution image 330.

A camera to perform a monitoring function is mounted in the robot 100. The high-resolution moving image is acquired by the camera, and such image acquisition is continued for a predetermined time.

The image input unit 110 provides a high-resolution moving image (hereinafter, referred to as an original image) acquired using the camera to the object region detection unit 120 and the resolution conversion unit 160.

The object region detection unit 120 detects an object (e.g., a person's face, a pet, or the like) set by the user from the original image. Examples of a method of detecting the object region include a Scale Invariant Feature Transform (SIFT) or the like. The detected rectangular object region is temporarily stored with four coordinates (x, y, width and height). Here, x and y respectively denote an x-axis coordinate and a y-axis coordinate of the left upper end of the rectangular object region, and width and height respectively denote the sizes of the rectangle. The images are primarily classified by a process of cropping and temporarily storing the detected object images, that is, a cropping process.

The clustering unit 130 classifies the object image cropped from the original image based on a similar feature according to objects and clusters the object image. Examples of the clustering method according to the objects include a K-means clustering algorithm or the like. The cropped object image is clustered because a high-resolution basis vector is generated according to the objects if the number of types of objects set by the user is plural. For example, if a person's face and a dog's face are set as an important object to be monitored in the original image, the image information of the person's face and the image information of the dog's face have respective different features and thus these two images may be classified into different groups using the K-means clustering algorithm.

The basis vector generation unit 140 generates the high-resolution basis vector available at the time of image restoration with respect to a group of clustered object images. A method of generating such a high-resolution basis vector will be described in detail.

If a k-th object image cropped from the original image is $i_k \in R^m$ (m is the dimension of an image vector) and a total of n object images is present in one cluster, a matrix M may be expressed by Equation 1 as a set of high-resolution object images.

$$M = [i_1 i_2 \ldots i_n] \qquad \text{Equation 1}$$

The matrix M may extract a Principal Component Analysis (PCA) basis vector using Singular Value Decomposition (SVD). At this time, Equation 2 is used.

$$M = U \Sigma V^T \qquad \text{Equation 2}$$

where, U denotes an m×m unitary matrix, Σ denotes a diagonal matrix, and V denotes an n×n matrix.

Figure 5:
FIG. 5 is a view showing a basis vector according to the example embodiments.

The U value becomes the PCA basis vector. The shape of the PCA basis vector U of a general face image is shown in FIG. 5. The generated basis vector is used to restore the object set in the converted low-resolution image into the high-resolution image. If the generated basis vector U is not the image cropped when the basis vector is generated, precise high-resolution restoration is impossible and as a result the basis vector functions as a private key.

Meanwhile, the resolution conversion unit 160 down-converts and provides the resolution of the high-resolution original image to the low-resolution generation unit 170. Examples of a method of down-converting the resolution include a method of down-converting a resolution using an average of peripheral pixels. This method is expressed by Equation 3

$$i^L = A i^H \qquad \text{Equation 3}$$

where, $i^L$ denotes a low-resolution image, $i^H$ denotes a high-resolution image, and A denotes a resolution conversion matrix. If the high-resolution original image $i^H$ is converted into the low-resolution image $i^L$ which is ¼ of the high-resolution image, A is expressed by Equation 4.

$$A = \begin{bmatrix} \frac{1}{16} & \frac{1}{16} & \cdots & \frac{1}{16} & 0 & 0 & \cdots & 0 & \cdots & 0 & 0 & \cdots & 0 \\ 0 & 0 & \cdots & 0 & \frac{1}{16} & \frac{1}{16} & \cdots & \frac{1}{16} & & 0 & 0 & \cdots & 0 \\ & & & & & & & & \ddots & & & & \\ 0 & 0 & \cdots & 0 & 0 & 0 & \cdots & 0 & \cdots & \frac{1}{16} & \frac{1}{16} & \cdots & \frac{1}{16} \end{bmatrix} \qquad \text{Equation 4}$$

By converting the resolution into low resolution, the amount of information to be transmitted to the server 200 is significantly decreased. For example, if the resolution of a 128×96 high-resolution image $i^H$ is converted, a 32×24 low-resolution image $i^L$ is obtained and thus transmission requirements are reduced. The low-resolution image is obtained by down-converting the resolution and functions as a public key which may be used to simply perform restoration using a general image restoration algorithm.

When the low-resolution image is leaked, the high-resolution original image may not be accurately reproduced by restoring the low-resolution image using a general method. In other words, the original image may be accurately restored using the low-resolution image and the object password information. By such security reinforcement, it is possible to prevent image leakage and interception.

The object image restoration unit 240 uses a Bayesian-based high-resolution restoration method when the high-resolution object image is restored from the low-resolution image.

If it is assumed that a high-resolution image $i^H$ and a low-resolution image $i^L$ are given, the Bayesian Equation used to estimate the high-resolution image using the low-resolution image is expressed by Equation 5.

$$P(i^H \mid i^L) = \frac{P(i^L \mid i^H) P(i^H)}{P(i^L)} \qquad \text{Equation 5}$$

Equation 5 shows a probability that the high-resolution image $i^H$ is estimated when the low-resolution image $i^L$ is given. When the high-resolution image is estimated using the given low-resolution image, a solution having a high probability needs to be obtained. If the low-resolution image is always given, a probability that the low-resolution image is given is constant. Therefore, when a maximum value max of a probability of estimating the high-resolution image is obtained, the probability that the low-resolution image is given may be ignored. Thus, Equation 5 is replaced with Equation 6.

$$\underset{i}{\operatorname{argmax}} P(i^H \mid i^L) \approx \underset{i}{\operatorname{argmax}} (P(i^L \mid i^H) P(i^H)) \quad \text{Equation 6}$$

Since the object password information detection unit 220 detects object password information from the received image information, the high-resolution PCA basis vector, an object region position corresponding to the object image 340 in the low-resolution image 330, and clustering information indicating what number cluster the image information belongs to, which are included in the object password information may be obtained. The high-resolution object image 350 may be restored using the obtained information.

For example, if q clusters are generated by the clustering unit 130, the high-resolution PCA basis vector generated by a k-th cluster becomes $U_k$. At this time, if a high-resolution image is given and the high-resolution image is applied to the high-resolution PCA basis vector, the applied high-resolution feature vector $y^H$ is expressed by Equation 7.

$$y^H = U_k^T (i^H - m^H) \quad \text{Equation 7}$$

where, $m^H$ denotes an average image.

Equation 7 is modified to obtain Equation 8. Using Equation 8, the high-resolution image may be generated from the high-resolution feature vector.

$$i^H = U_k y^H + m^H \quad \text{Equation 8}$$

In other words, since a high-resolution PCA basis vector is included, the desired high-resolution image may be restored if the high-resolution feature vector may be restored from the high-resolution PCA basis vector.

Therefore, in Equation 6, $P(i^L \mid i^H)$ and $P(i^H)$ may be expressed by Equation 9.

$$P(i^L \mid i^H) = \frac{1}{z} \exp\left\{-\frac{1}{2\sigma^2} (Ai^H - i^L)^T (Ai^H - i^L)\right\} \approx P(i^L \mid y^H) = \quad \text{Equation 9}$$
$$\frac{1}{z} \exp\left\{-\frac{1}{2\sigma^2} (A(U_k y^H + m^H) - i^L)^T (A(U_k y^H + m^H) - i^L)\right\}$$
$$P(i^H) \approx P(y^H) = \frac{1}{z} \exp\left\{-\frac{1}{2} y^{H^T} V^{-1} y^H\right\}$$

The estimation of the high-resolution feature vector using the low-resolution image is expressed by Equation 10.

$$\bar{y}^H = \underset{y^H}{\operatorname{argmax}} (P(i^L \mid y^H)) \quad \text{Equation 10}$$
$$= \underset{y^H}{\operatorname{argmin}} (\sigma^2 y^{H^T} V^{-1} y^H +$$
$$\{A(U_k y^H + m^H) - i^L\}^T \{A(U_k y^H + m^H) - i^L\})$$

Since the objective function of Equation 10 is a quadratic equation, a minimum value may be obtained using partial differentiation. Therefore, a high-resolution feature vector to minimize the quadratic equation may be estimated according to Equation 11.

$$\bar{y}^H = (U_k^T A^T A U_k + \sigma^2 V^{-1})^{-1} U_k^T A^T (i^L - Am^H) \quad \text{Equation 11}$$

Using the estimated high-resolution feature vector, the high-resolution object image may be restored according to Equation 12.

$$i^H = U_k \bar{y}^H + m^H \quad \text{Equation 12}$$

Figure 6:
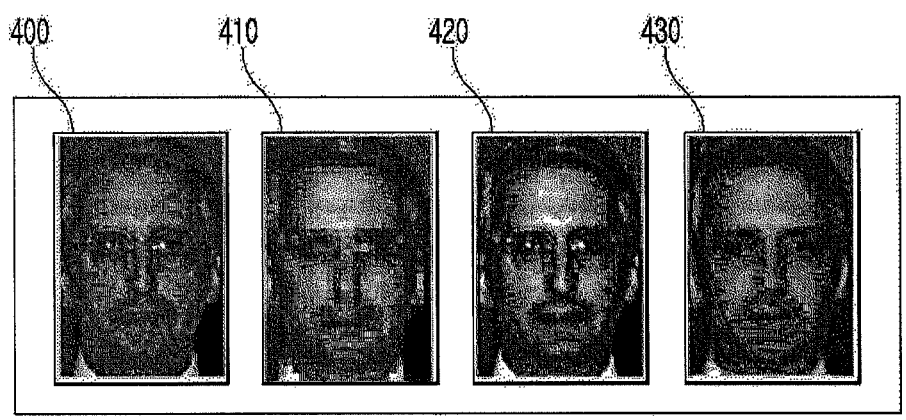
FIG. 6 is a view showing an original image, a low-resolution image, a restored image and an image restored by a general basis vector according to the example embodiments.

In FIG. 6, 400 denotes a 128×96 high-resolution original image photographed by the camera of the robot 100, 410 denotes a 32×24 low-resolution image converted by the resolution conversion unit 160 using a resolution conversion matrix A, 420 denotes a 128×96 high-resolution image restored according to example embodiments, and 430 denotes a 128×96 high-resolution image restored using the general basis vector instead of the PCA basis vector.

It can be seen that the high-resolution image 420 restored according to the example embodiments has excellent image restoration performance compared with the high-resolution image 430 restored using the general basis vector.

Figure 7:
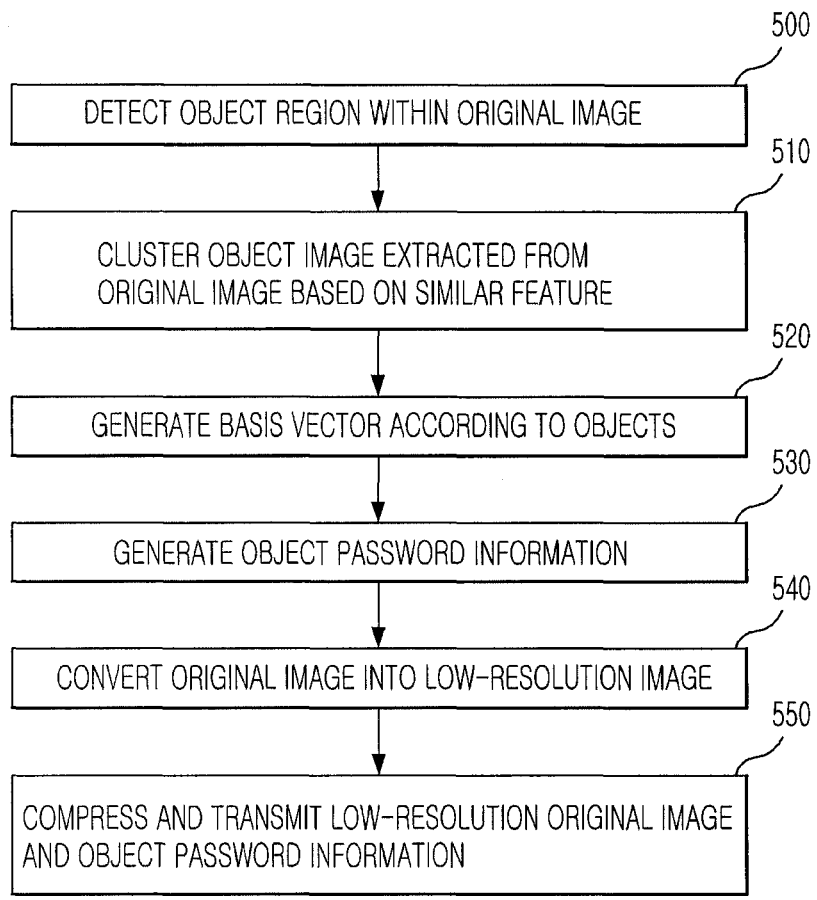
FIG. 7 is a flowchart illustrating an image processing method performed by a robot according to example embodiments.

FIG. 7 is a flowchart illustrating an image processing method processed by a robot according to example embodiments.

The object region within the original image 300 is detected (500). At this time, SIFT or the like may be used as the method of detecting the object regions.

The object image 310 of the detected object region is clustered based on the similar feature (510). At this time, the K-means clustering algorithm or the like may be used as the clustering method according to the objects.

With respect to the clustered object, the high-resolution basis vector is generated according to the objects (520). At this time, the generation of the basis vector is performed by extracting the PCA basis vector using SVD.

Then, the object password information is generated by including the detected object region, clustering information indicating what number cluster the object image classified by clustering belongs to and the high-resolution PCA basis vector (530).

In parallel with the image processing of the object region, the original image is converted into the low-resolution image using the resolution conversion matrix (540).

Then, the image information including the low-resolution original image and the object password information is compressed and the compressed image information is transmitted to the server 200 over the network (550).

Since the high-resolution image may not be accurately restored if the object password information is not applied to the low-resolution image which is leaked, it is possible to prevent privacy from being violated due to image leakage and interception.

Figure 8:
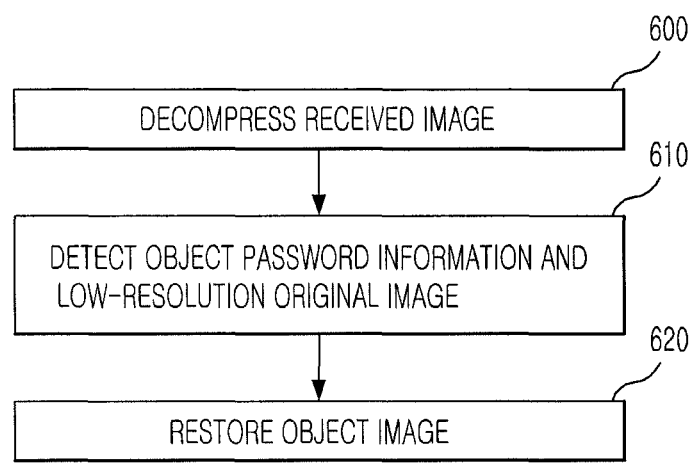
FIG. 8 is a flowchart illustrating an image processing method performed by a server according to example embodiments.

FIG. 8 is a flowchart illustrating an image processing method executed by a server according to example embodiments.

The server 200 decompresses the received image information (600). The object password information and the low-resolution original image are detected from the decompressed image information (610).

Then, since the high-resolution PCA basis vector, the object region position corresponding to the object image 340 in the low-resolution image 330, and clustering information indicating what number cluster the image information belongs to are included in the object password information, the high-resolution feature vector is estimated using the Bayesian-based high-resolution restoration method with this information and the low-resolution image 330, and the high-resolution object image 350 is restored from the estimated high-resolution feature vector (620).

According to the image processing apparatus of the robot system and the method and computer readable medium thereof according to the example embodiments, since large volumes of images acquired by a robot are converted into low-resolution images to significantly reduce transmission requirements, it is possible to prevent excessive network load from being caused when the large volumes of images are transmitted to a server over a network. In addition, it is possible to reinforce security with respect to an object region, which need to be carefully subjected to image processing, to prevent image leakage.

The above-described embodiments may be recorded in computer-readable media including program instructions to implement various operations embodied by a computer. The media may also include, alone or in combination with the program instructions, data files, data structures, and the like. Examples of computer-readable media (computer-readable storage devices) include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although embodiments have been shown and described, it should be appreciated by those skilled in the art that changes may be made in these embodiments without departing from the principles and spirit of the disclosure, the scope of which is defined in the claims and their equivalents.

What is claimed is:

1. An image processing method of a robot system, the method comprising:
    acquiring an original image by a robot;
    generating, by a processor, object password information based on an object image of the original image, the object password information being used to restore the object image of the original image; and
    generating, by the processor, a low-resolution image of the original image by converting a resolution of the original image into a low resolution,
    wherein the generating of the object password information includes detecting an object region corresponding to the object image of the original image, clustering the detected object region based on a similar feature, generating cluster information indicating which cluster the object region belongs to, and generating a high-resolution basis vector used to restore the object image.

2. The method according to claim 1, further comprising compressing image information including the object password information and the low-resolution image and transmitting the compressed information from the robot to a server over a network.

3. The method according to claim 1, wherein the detecting of the object region is performed using Scale Invariant Feature Transform (SIFT).

4. The method according to claim 1, wherein the clustering of the object region is performed using a K-means clustering algorithm.

5. The method according to claim 1, wherein the generating of the basis vector includes extracting a high-resolution Principal Component Analysis (PCA) basis vector using Singular Value Decomposition (SVD).

6. The method according to claim 1, wherein the converting of the resolution of the original image includes down-converting the resolution using an average of peripheral pixels.

7. The method according to claim 1, wherein the original image includes a moving image continuously photographed by a camera of the robot.

8. The method according to claim 1, further comprising acquiring the object image from the original image by cropping the object image from the original image.

9. An image processing method of a robot system, the method comprising:
    detecting, by a processor, object password information based on an object image of an original image, the object password information being used to restore the object image of the original image, and a low-resolution image obtained by converting a resolution of the original image into a low resolution, from image information received from a server; and
    restoring, by the processor, the object image using the object password information and the low-resolution information,
    wherein the detected object password information includes an object region corresponding to the object image of the original image, cluster information indicating which cluster the detected object region belongs to, and a high-resolution Principal Component Analysis (PCA) basis vector used to restore the object image.

10. The method according to claim 9, wherein the restoring of the object image is performed using a Bayesian-based high-resolution restoration method.

11. The method according to claim 10, wherein the restoring of the object image includes estimating a high-resolution feature vector from the object password information and restoring the object image using the estimated high-resolution feature vector.

12. At least one computer readable medium comprising computer readable instructions that control at least one processor to implement the method of claim 9.

13. The method according to claim 9, further comprising acquiring the object image from the original image by cropping the object image from the original image.

14. An image processing apparatus of a robot system, the image processing apparatus comprising:
    an image input unit to acquire an original image;
    an object region detection unit to detect an object region corresponding to an object image of the original image;

a clustering unit to generate cluster information indicating which cluster the object region belongs to, and to cluster the detected object region based on a similar feature and assign the object region to a cluster;

a basis vector generation unit to generate a high-resolution basis vector used to restore the object image of the original image;

an object password generation unit to generate object password information based on the object image of the original image, the object password information being used to restore the object image of the original image, by using the detected object region, the generated cluster information, and the generated high-resolution basis vector; and a low-resolution generation unit to generate a low-resolution image of the original image by converting a resolution of the original image into a low resolution.

15. The image processing apparatus according to claim 14, further comprising an image compression and transmission unit to compress image information including the object password information and the low-resolution image and to transmit the compressed information to a server over a network.

16. The image processing apparatus according to claim 14, wherein the object region detection unit detects the object region using Scale Invariant Feature Transform (SIFT).

17. The image processing apparatus according to claim 14, wherein the clustering unit clusters the object region using a K-means clustering algorithm.

18. The image processing apparatus according to claim 14, wherein the basis vector generating unit extracts a high-resolution Principal Component Analysis (PCA) basis vector using Singular Value Decomposition (SVD).

19. An image processing apparatus of a robot system, the image processing apparatus comprising:

an object password information detection unit to detect object password information based on an object image of an original image from image information received from a server, the object password information being used to restore the object image of the original image;

a low-resolution detection unit to detect the low-resolution image of the original image from the image information; and an object image restoration unit to restore the object image using the object password information and the low-resolution image, wherein the detected object password information includes an object region corresponding to the object image of the original image, cluster information indicating which cluster the detected object region belongs to, and a high-resolution Principal Component Analysis (PCA) basis vector used to restore the object image.

20. The image processing apparatus according to claim 19, wherein the object image restoration unit restores the object image using a Bayesian-based high-resolution restoration method.

21. The image processing apparatus according to claim 20, wherein the object image restoration unit estimates a high-resolution feature vector from the object password information and restores the object image using the estimated high-resolution feature vector.

\* \* \* \* \*